(12) United States Patent
Sanchez

(10) Patent No.: US 9,703,985 B1
(45) Date of Patent: Jul. 11, 2017

(54) CONCEALING A PERSONAL NUMBER

(71) Applicant: James S. Farrin, P.C., Durham, NC (US)

(72) Inventor: Eric Jason Sanchez, Cary, NC (US)

(73) Assignee: James S. Farrin, P.C., Durham, NC (US)

( * ) Notice: Subject to any disclaimer, the term of this patent is extended or adjusted under 35 U.S.C. 154(b) by 0 days.

(21) Appl. No.: 15/468,877

(22) Filed: Mar. 24, 2017

(51) Int. Cl.
*G06F 21/62* (2013.01)
*G06F 21/84* (2013.01)

(52) U.S. Cl.
CPC .......... *G06F 21/6245* (2013.01); *G06F 21/84* (2013.01)

(58) Field of Classification Search
CPC .............................. G06F 21/6245; G06F 21/84
See application file for complete search history.

(56) References Cited

U.S. PATENT DOCUMENTS

| | | | |
|---|---|---|---|
| 7,552,467 B2 | 6/2009 | Lindsay | |
| 8,850,556 B2 | 9/2014 | Freund et al. | |
| 2014/0173503 A1* | 6/2014 | Catania | G06F 17/30905 715/781 |

OTHER PUBLICATIONS

Zhu et al. "Captcha as Graphical Passwords—A New Security Primitive Based on Hard AI Problems", IEEE, v.9, No. 6, Jun. 2014, 891-904.*
TheCleaner et al. "active directory AD storing last 4 of employee social sec number as the employeeNumber attritubte?", Server fault, Mar. 12, 2014, 2 pages.*

* cited by examiner

*Primary Examiner* — Oleg Korsak
(74) *Attorney, Agent, or Firm* — Malhotra Law Firm, PLLC; Deepak Malhotra

(57) ABSTRACT

A method includes receiving information about a person at a server, the information including a name and a personal number; storing the name and a portion of the personal number in a database in the server, such that the name and portion of the personal number are searchable; converting the personal number to an image that is designed to not be easily readable by optical character recognition, and storing the image; receiving, at the server, a request for a search of the database from a client device including a graphical user interface that has a movable pointer capable of hovering over a spot on the graphical user interface; displaying the name and the portion of the personal number, at a user client device in communication with the server, in response to results of the search matching information about the person; and displaying the image at the user client device in response to the pointer hovering over the portion of the personal number. Other systems and methods are provided.

17 Claims, 11 Drawing Sheets

Person Information
Prefix  First Name — 204  Middle Name — 206  Last Name — 208  Suffix — 210
       Nick              X.                  Smith
— 202

Date of Birth — 212   Stated Age — 214   Age — 216         Date of Death — 220
mm/dd/yyyy                                                 mm/dd/yyyy Gender — 222   Race — 224                   Languages — 226

AKA Name — 228                              Bar Number — 230      SSN (Last Four)       Enter SSN to change
                                                                  1342 — 234            123456789 — 232

Employer Company Name — 236                 Job title — 238

Veteran Status   Imported to Quickbooks     Active  Locked
□ — 240          ☑ — 242                    □—244   □—246

Comment/Notes — 248

Client
James Scott Farrin — 250

252 — Update Person  Cancel — 254                              Delete — 256

| Casee | × | |
|---|---|---|
| ← → C ⌂ | 🔒 Secure | https://farrin.caseesoftware.com/casey/cases/1000000 |
| ■ ☐ Bookmarks ☐ ConverTrack | ConverTrack | Casee  STAGING  Audit Logs |

▽ Casee

| Case Number | Client | | Role | Language | Case Type | Damage Category | Case Status | Department |
|---|---|---|---|---|---|---|---|---|
| 1000000 | Nick X. Smith ( ) | | Claimant | | L1 | Subjective | INV | |
| Alt # | Last Note | | Paralegal | Primary Attorney | Physical File | Negotiator | Primary Recovery | Health Insurance |
| 324 | 01/17/2017 | | EJS | | Unknown | | | Health |

▽ Damages (MED (1)) clear filters  View Digest  Add Ledger Entry ⊞
326

| Type | Provider | | Billed | Payments | Due | Damages | Service Duration |
|---|---|---|---|---|---|---|---|
| > MED | Med | | $1,000.00 | $850.00 | $150.00 | $500.00 | 12/01/2016 - 12/04/2016 |
| | | Total (1 rows): | $1,000.00 | $850.00 | $150.00 | $500.00 | |

> Liens and Other Subrogation Claims

> Expenses and Other Disbursements

> Ledger Type Subtotals

> Damage Summaries

FIG. 4A

| FIG. 4A | FIG. 4B |
|---|---|
| FIG. 4C | FIG. 4D |

- LITIGATION — 328
- › LITIGATION
- INCIDENT — 330

Police Report Number
Date PR Received
Street Location See PR
Client Position
City
Passenger in AtFault
State
Number of People in MVA
County
JSF Rep Others Narrative
Estimated Damage
Client Own Vehicle
Vehicle Drivable
Airbag Deployed
AlcoholDrugs Suspected
Veh Photos Taken
AlcoholDrug Test
Actual PD
Contrib Code Box 1

PD Paid by
Contrib Code Box 2
Type
Contrib Code Box 3
AtFault OwnerDriver Same
Coverage
Multiple Defendants
DWI
HR CR
Type of Coverage
AFD 1 Contrib Codes
AGD 1 Citation
AFD 1 Violation
AFD 1 PD Amt
AFD 2 Contrib Codes
AFD 2 Citation
AFD 2 Violation
AFD 2 PD Amt ☑ Show Unanswered

- COVERAGE — 332

336, 338, 340

300

Adjuster　　　　　　　Coverage Type　　　　　Claim #　　　　Insured　　　　　　　　　　Add Insurance Policy > Insurance Company of Illinois　Health　　　　　　　　　　　　　　　　　　　　　　　L/S　Rel?
322
> North Provinces Ins. Co.　Liability 1　　　　　　　　　　　　　　　　　　　　　2　M

⊙ CLIENT INFORMATION

∨ Personal Info

Name　Nick X. Smith ⌐ 302　　　SSN Last Four　6789 ⌐ 304　　　　　　　　　M　X
　Date of Birth　0 ⌐ 306　　　　　　AKA Name ⌐ 308
　Age at DOI ⌐ 310　　　　　　　　Job Title ⌐ 312　　　　　　　　　320 ⌐ ✎
　　Gender ⌐ 314　　　　　　　　　Aliases ⌐ 316
　　　Race ⌐ 318

> Contact Info

> Life Events (0)

> Miscellaneous

> Intake

> CSAT

⊡ COMPANION AND RELATED CASES　　　　　　　　　　　　　　　　　Add Insurance Policy

⌐ 334
Casee #　　　Client/Claimant　　　　　　　Case Type　　　　　　Case Status

No Companion Cases

FIG. 4D

| | | | | | | | |
|---|---|---|---|---|---|---|---|
| ◊ Casee | × | ☐ | | | | | |
| ← → C ⇧ | 🔒 Secure \| https://farrin.caseesoftware.com/casey/cases/1000000 | | | | | | |
| ■ ☐ Bookmarks ☐ ConverTrack ✿ ConverTrack ✿ Casee ✿ STAGING ✿ Audit Logs | | | | | | | |

▷ Case

| Case Number | Client | Role | Language | Case Type | Damage Category | Case Status | Department |
|---|---|---|---|---|---|---|---|
| 1000000 | Nick X. Smith ( ) | Claimant | | L1 | Subjective | INV | |
| Alt # 324 | Last Note 01/17/2017 | Paralegal EJS | Primary Attorney | Physical File Unknown | Negotiator | Primary Recovery | Health Insurance Health |

▽ Damages (MED (1)) clear filters
326

|  |  |  |  |  | View Digest | [+] Add Ledger Entry |
|---|---|---|---|---|---|---|
| Type | Provider | Billed | Payments | Due | Damages | Service Duration |
| > MED | Med | $1,000.00 | $850.00 | $150.00 | $500.00 | 12/01/2016 - 12/04/2016 |
| | Total (1 rows): | $1,000.00 | $850.00 | $150.00 | $500.00 | |

› Liens and Other Subrogation Claims

› Expenses and Other Disbursements

› Ledger Type Subtotals

› Damage Summaries

FIG. 5A

| FIG. 5A | FIG. 5B |
|---|---|
| FIG. 5C | FIG. 5D |

| Adjuster | Coverage Type | Claim # | Insured | Add Insurance Policy |
|---|---|---|---|---|
| | | | | L/S Rel? |
| > Insurance Company of Illinois 322 | Health | | | 2 M |
| > North Provinces Ins. Co. | Liability 1 | | | M X |

⊙ CLIENT INFORMATION

∨ Personal Info

| Name | Nick X. Smith | SSN Last Four | 6789 | |
|---|---|---|---|---|
| Date of Birth | 0 | AKA Name | | |
| Age at DOI | | Job Title | 123 45 6789 ← 402 | 320 ✐ |
| Gender | | Aliases | | |
| Race | | | | |

> Contact Info

> Life Events (0)

> Miscellaneous

> Intake

> CSAT

⊟ COMPANION AND RELATED CASES       Add Insurance Policy
334

| Casee # | Client/Claimant | Case Type | Case Status |
|---|---|---|---|
| | | No Companion Cases | |

FIG. 5D

CONCEALING A PERSONAL NUMBER

TECHNICAL FIELD

The technical field comprises cyber security. The technical field also comprises systems and methods for impeding machine reading of sensitive personal data.

BACKGROUND

When managing sensitive data of other people, such as identity numbers (e.g., social security numbers, social insurance numbers, health insurance numbers, driver's licenses, passport numbers), credit card numbers, or other highly sensitive information, it is important to safeguard that information. If unscrupulous hackers or system attackers obtain some person's identity information, they may be able to steal that person's identity, purchase items using their credit, steal benefits or tax refunds, or otherwise harm that person.

An organization that loses sensitive information contained in their database to a hacker faces potential substantial liability if the sensitive data is stolen and used improperly.

A typical solution is to use deterministic encryption, where one value encrypted multiple times using a key "K" gives the same output every time. Given deterministic encryption an attacker would need to know the key "K" to recover the underlying value. Some searches can be performed on the encrypted data in the database, but typically only equivalency comparisons such as equal to or not equal to.

Many databases provide encryption along with some key management, for example, SQL Server supports encryption. MySQL also supports encryption via query functions. CryptDB is a database system that encrypts data and supports running queries on encrypted data.

U.S. Pat. No. 7,552,467 to Lindsay (incorporated herein by reference) discloses password-based security systems that can provide different levels of access responsive to entry of a primary or secondary password. In some versions, user-configurable security rules can provide customized responses to entry of primary or secondary passwords, including feigned or limited access.

SUMMARY

Some embodiments provide a method including receiving information about a person at a server, the information including a name and a personal number; storing the name and a portion of the personal number in a database in the server, such that the name and portion of the personal number are searchable; converting the personal number to an image that is designed to not be easily readable by optical character recognition, and storing the image; receiving, at the server, a request for a search of the database from a client device including a graphical user interface that has a movable pointer capable of hovering over a spot on the graphical user interface; displaying the name and the portion of the personal number, at a user client device in communication with the server, in response to results of the search matching information about the person; and displaying the image at the user client device in response to the pointer hovering over the portion of the personal number.

Other embodiments provide a system having a server configured to receive information about a person, the information including a name and a personal number, the server including a database having fields configured to store the name and a portion of the personal number, such that the name and the portion of the personal number are searchable; a formatter configured to convert the personal number to a format that is difficult for an automated system to recognize, and the server being configured to store the converted personal number; and a graphical user interface generator configured to cause display of the name and the portion of the personal number at a user client device in communication with the server, in response to a search of the database requested from the client device resulting in information about the person matching the search, the graphical user interface generator including an display reveal detector which, if actuated by the user of the client device, causes the converted personal number to be displayed at the user client device.

Still other embodiments provide a system having a server configured to receive information about a person, the information including a name and a social security number, the server including a database having fields configured to store the name and a portion of the personal number, such that the name and the portion of the social security number are searchable; a formatter configured to convert the social security number to a distorted image containing all digits of the social security number such that the digits are not lined up, and that is difficult for an automated system to recognize, and the server being configured to store the distorted image in the database; a graphical user interface generator configured to cause display of a graphical user interface showing the name and the portion of the personal number at a user client device in communication with the server; and a user client device configured to receive the graphical user interface from the server and to display, in response to a successful search of the database, the name and the portion of the social security number, the graphical user interface generator including an display reveal detector which, if actuated by the user of the client device by the user hovering over the portion of the social security number, causes the distorted image to be displayed at the user client device.

BRIEF DESCRIPTION OF THE VIEWS OF THE DRAWINGS

FIG. 3 is a screen shot illustrating data being entered into the system of FIG. 1, in accordance with various embodiments.

Figure 4B:
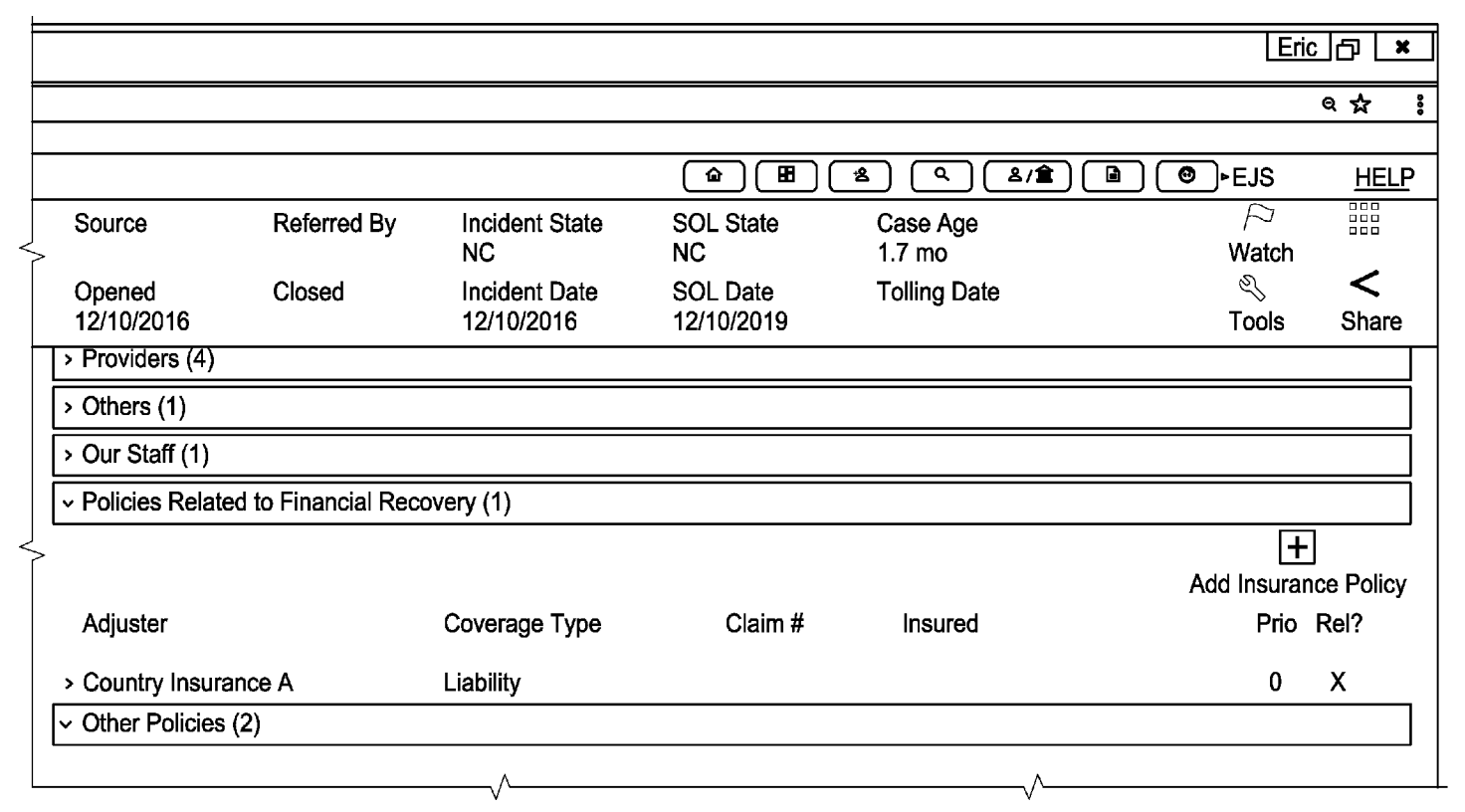

FIG. 4 is a map showing how FIGS. 4A, 4B, 4C, and 4D are to be assembled.

FIG. 4A is a portion of a screen shot illustrating how only a portion of the data is stored in a database of the system of FIG. 1, in accordance with various embodiments.

FIG. 4B is a second portion of the screen shot of FIG. 4A.

FIG. 4C is a third portion of the screen shot of FIG. 4A.

FIG. 4D is a fourth portion of the screen shot of FIG. 4A.

Figure 5B:
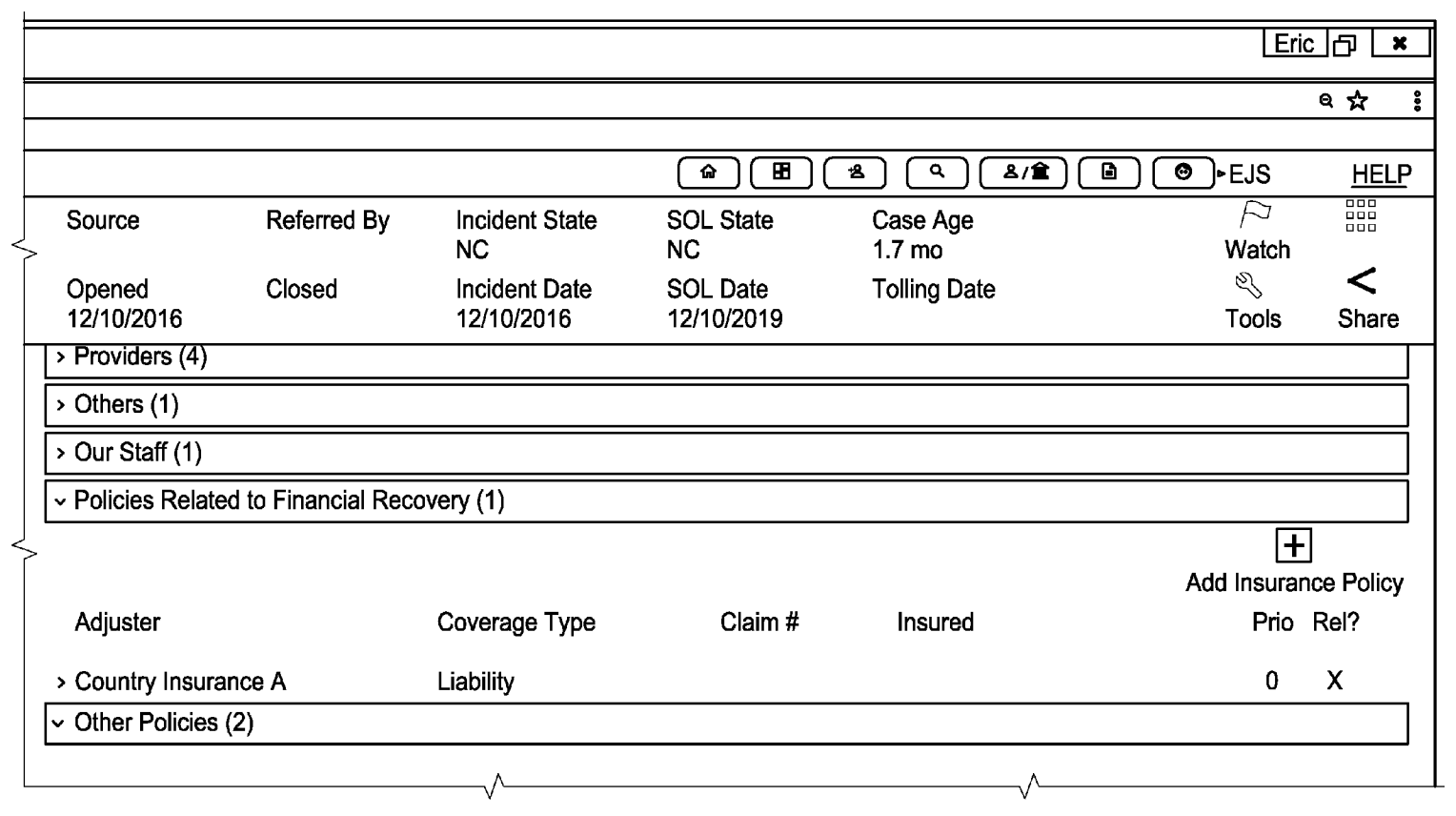

FIG. 5 is a map showing how FIGS. 5A, 5B, 5C, and 5D are to be assembled.

FIG. 5A is a portion of a screen shot illustrating how complete data is revealed, using the system of FIG. 1, in accordance with various embodiments.

FIG. 5B is a second portion of the screen shot of FIG. 5A.

FIG. 5C is a third portion of the screen shot of FIG. 5A.

FIG. 5D is a fourth portion of the screen shot of FIG. 5A.

DETAILED DESCRIPTION OF THE ILLUSTRATED EMBODIMENTS

Attention is directed to commonly assigned U.S. patent application Ser. No. 15/434,565, Sanchez et al., filed Feb. 16, 2017 and incorporated herein by reference. In some embodiments, the features described below are used in connection with the systems described in this incorporated patent application.

Figure 1:
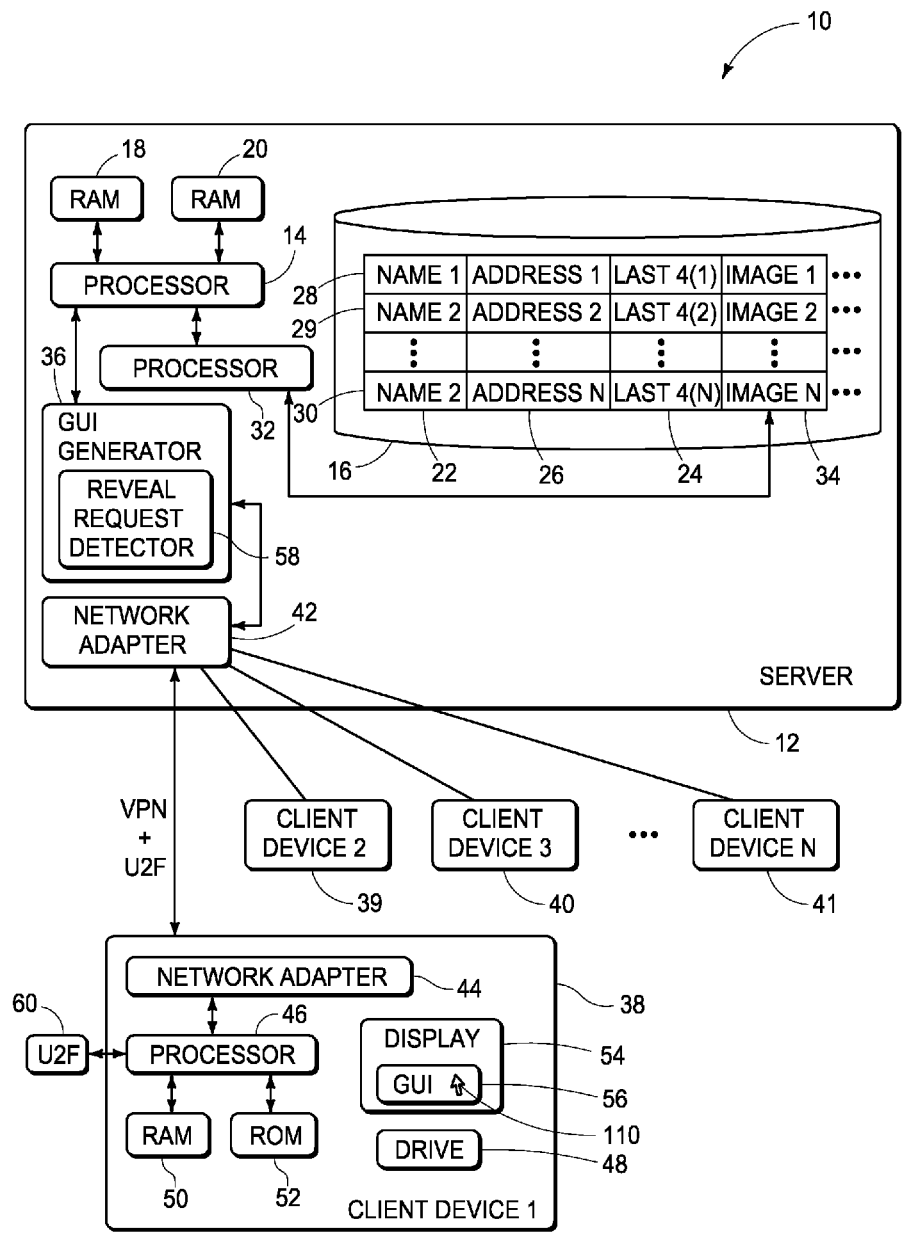
FIG. 1 is a block diagram of a system in accordance with various embodiments.

FIG. 1 shows a system 10 in accordance with various embodiments. The system 10 includes a server 12 configured to receive information about a person. The server 12 includes server components such as a processor 14. As used herein, the term processor encompasses processors having one or multiple processor cores. The server 12 further includes short term memory and long term memory. More particularly, the server 12 includes a database 16 defined in long term memory, such as on a hard drive or solid state drive. The server 12 further includes random access memory (RAM) 18 and read only memory (ROM) 20 that are either onboard the processor 14, off board, or both.

The database 16, in the illustrated embodiments, includes searchable fields for a name 22 and a portion 24 of a sensitive personal number such as a social security number, social insurance number, health insurance number, passport number, national identity card number, state identity number (e.g., driver's license), credit card number, or other sensitive, confidential, or personal information. The database 16 can also include fields for other information about a person such as the person's address 26. Additional information can also be stored. For example, medical records can be stored for the person in the database 16. In other embodiments, such as those in which the system 10 is used with the system of the above-incorporated patent application, information relevant to a legal cause of action for the person is stored in the database 16. In more particular embodiments, the database 16 stores the last four digits of a person's social security number in field 24. In the illustrated embodiment, the database stores information for multiple people 28, 29, 30, etc. and includes fields 22, 24, 26 and 34 (described below) for each person. If a database search is performed using the last four digits of a person's social security number, the records for the person can be found even though the complete number is not stored in a machine searchable fashion. In some embodiments, the database 16 further stores medical records. In some embodiments, first, middle, and last name of a person are stored in separate fields in the database 16. In other embodiments, last name and first name of a person are stored in a single field (typically in Last Name, First Name format).

In the illustrated embodiments, the server 12 further includes a formatter 32 that converts the sensitive personal number to an image file (e.g., jpeg, gif, pdf, bitmap, etc. format) containing a distorted image of all digits of the number such that the digits are not lined up on a horizontal line. The digits may also be in different font types or font sizes. Extraneous markings may also be included to confuse an automated system. The format is one that is difficult for an automated system, such as an optical character recognition system, to recognize. In the illustrated embodiments, the server 12 stores this distorted image of a person's personal number in a field 34 of the database 16. In other embodiments, the distorted image is stored in a separate database or even in a separate server. In some embodiments, the database 16 is encrypted but searchable. In some embodiments, where a separate database is employed, the separate database is encrypted.

In the illustrated embodiments, the server 12 further includes a graphical user interface generator 36 configured to cause the display of a graphical user interface 56 of a client device 38 (described below) to show the name, and the portion of the personal number.

More particularly, in the illustrated embodiments, the system 10 includes one or more user client devices 38, 39, 40, 41, etc. that can connect to the server 12 over a LAN, WAN, or via the Internet.

In the illustrated embodiments, the server 12 includes one or more network adapters or modems 42 and each client device 38-41 includes one or more network adapters or modems 44 that allows the client device to communicate with the server 12 over the LAN, WAN, or Internet.

The client devices 38-41 each further include a processor 46 in communication with the network adapter 44, include long term and short term memory such as one or more hard drives or solid state drives 48, and include onboard, off board (or both) RAM 50 and ROM 52 in communication with the processor 46. The client devices 38-41 also each include a display or monitor 54.

In various embodiments, the client devices 38-41 are each configured to receive the graphical user interface 56 from the server and to display, in response to a successful search of the database, the name and the portion of the personal number to a user of the client device using its graphical user interface 56.

More particularly, in some embodiments, the graphical user interface generator 36 includes a reveal request detector 58. The reveal request detector 58 is actuated if the user of the client device 38-41 hovers (e.g., using a mouse or trackpad pointer) over the portion 24 of the personal number. If actuated, the reveal request detector 58 causes the distorted image of field 34 to be displayed at the user client device 38-41 (e.g., in a pop-up window or elsewhere on the display 54). In some embodiments, if the user moves his mouse or trackpad pointer away from the portion 24, the image of field 34 disappears.

In the illustrated embodiments, each of the client devices 38-41 communicate with the server 12 over a virtual private network (VPN) for added security. Further, in some embodiments, the server 12 supports a U2F protocol and a U2F key 60 is required at the user client device 38-41 for the user client device to communicate with the server 12.

Figure 2:
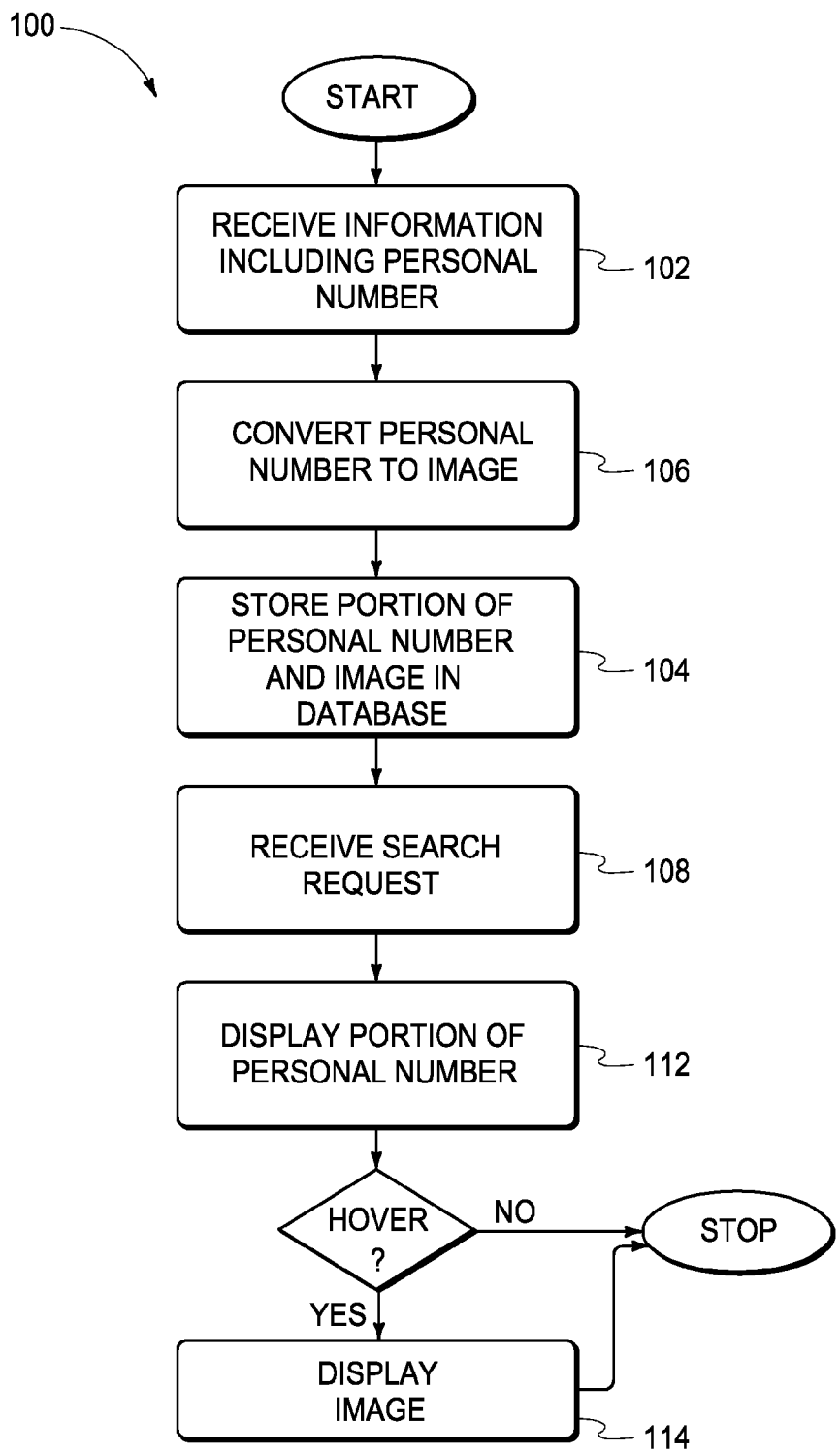
FIG. 2 is a flowchart of a method, using the system of FIG. 1, in accordance with various embodiments.
Figure 5C:
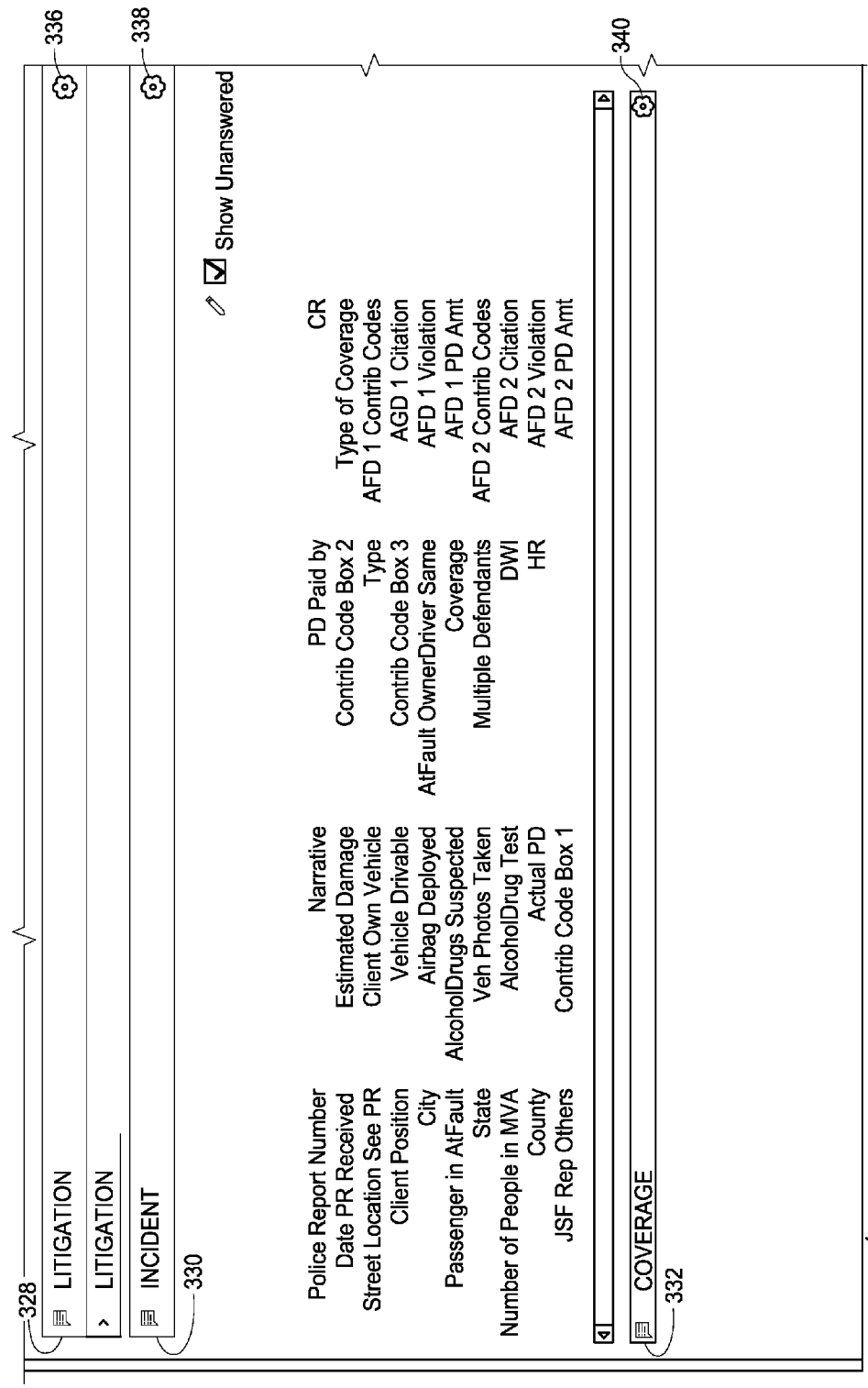

FIG. 2 illustrates a method 100 of using the system 10 in accordance with some embodiments.

The method 100 includes, in various embodiments, receiving 102 information about a person at the server 12, the information including at least a name (or other identifying information) and a personal number.

The method 100 further includes, in various embodiments, storing 104 the name and a portion of the personal number in the database 16 in the server 12, or elsewhere in a memory in the server 12, such that the name and portion of the personal number are searchable.

The method 100 further includes, in various embodiments, converting 106 the personal number to an image that is designed to not be easily readable by optical character recognition, and storing the image. The image can be stored in the database 16, in a separate database, elsewhere in a memory in the server 12, or in another memory or another server. Items 104 and 106 of the method 100 can be performed in any order. In some embodiments, 104 occurs before 106. In other embodiments, 106 occurs before 104.

The method 100 further includes, in various embodiments, receiving 108, at the server 12, a request for a search of the database 16 from the client device 38 including the graphical user interface 56 that has a movable pointer 110 (e.g., mouse or trackpad pointer) capable of hovering over a spot on the graphical user interface 56.

The method 100 further includes, in various embodiments, displaying 112 the name 22 and the portion 24 of the personal number, at the user client device 38 in communication with the server 12. This is performed in response to a positive search result.

The method 100 further includes, in various embodiments, displaying 114 the image at the user client device 38 in response to the pointer 110 hovering over the portion 24 of the personal number.

In various embodiments, the image 34 contains the full personal number in a non-linear arrangement of digits. The term "digits," as used herein, is meant to encompass both numbers and alphabetical characters. In some embodiments, the personal number is a government identity number. In more particular embodiments, the identity number is a social security number. In other embodiments, the personal number is a credit card number. In still other embodiments, the personal number is health information such as data about the health of a person (e.g., blood pressure, cholesterol, weight, height, eyesight, information identifying presence of an infectious disease, etc.) or a health insurance number. In some embodiments, the received information further includes an address (field 26 of database 16), and the address is searchable in the database. In some embodiments, the image is stored in the same database 16 that contains the name (field 22 of database 16) and the portion (field 24 of database 16) of the personal number.

FIG. 3 illustrates a screen 200 of the graphical user interface 56 for entering data about a person into the system 10 of FIG. 1, in accordance with various embodiments. In the illustrated embodiments, the screen 200 includes a text box 202 into which the person's prefix or title (Mr., Ms., Mrs., Dr., Baron, Count, etc.) can be entered by a user, a text box 204 into which the person's first name can be entered, a text box 206 into which the person's middle name or initial can be entered, a text box 208 into which the person's last name can be entered, and a text box 210 into which the person's suffix (junior, senior, esq., etc.).

In the illustrated embodiments, the screen 200 further includes a text box 212 into which the person's date of birth can be entered. In the illustrated embodiments, the date is entered in a mm/dd/yyyy format. Other formats could be employed, pull down menus could be provided for each of the month, data, and year; separate text boxes could be provided for each of month, date, and year; or a pop up calendar can be used, etc. In the illustrated embodiments, the screen 200 further includes a text box 214 into which the person's stated age can be entered, a text box 216 into which the person's actual age can be entered (or an area 216 where the person's actual age is displayed after being calculated automatically from the date of birth), and a text box 220 into which the person's date of death can be entered. As with the date of birth, in the illustrated embodiments, the date of death is entered in a mm/dd/yyyy format. Other formats could be employed, pull down menus could be provided for each of the month, data, and year; separate text boxes could be provided for each of month, date, and year; or a pop up calendar can be used, etc.

In the illustrated embodiments, the screen 200 further includes a pull down menu 222 using which a user can select the person's sex from predefined alternatives, a pull down menu 224 using which a user can select the person's race from predefined alternatives, and a text box 226 into which languages understood by the user can be entered. Alternatively, a pull down menu or radio buttons could be used to enter the person's languages.

In some embodiments, the screen 200 further includes a text box 228 into which the person's alias or AKA name can be entered.

In some embodiments, the screen 200 further includes a text box 230 into which the person's bar number can be entered (if an attorney) or a similar professional number.

In the illustrated embodiments, the screen 200 further includes a text box 232 into which the person's entire sensitive personal number (e.g. social security number, social insurance number, passport number, credit card number, health insurance number, national identity number, state identity number, etc.) can be entered. In some embodiments, only users with a certain clearance level (e.g. administrators or users granted high level access) can enter or edit the full sensitive personal number. In the illustrated embodiments, the person's social security number is entered. In the illustrated embodiments, the screen 200 further includes an area 234 where a portion of the personal number is displayed after an entire number has been entered in text box 232 and the person's details have been updated. In the illustrated embodiments, the last four digits of the person's social security number is displayed in this area. In some embodiments, multiple such text boxes or fields are provided for multiple different types of sensitive personal numbers.

The screen 200, in the illustrated embodiments, further includes a text box 236 into which the person's employer's name can be entered, a text box 238 into which the person's job title can be entered, a check box 240 which can be checked to indicate that the person is a veteran, a check box 242 which can be checked to indicate if the data has been or should be exported to an accounting program such as Quickbooks, a check box 244 for which can be checked to indicate if the person is an active client or contact, a check box 246 which can be checked to lock the record against editing, and a text box or field 248 into which notes about the person can be entered. In the illustrated embodiments, the screen 200 further includes an area 250 for indicating whose client the person is. For example, a user may administer the database for multiple firms or businesses each having multiple clients or customers.

In the illustrated embodiments, the screen 200 further includes an element, such as a button 252, which, when actuated, updates the database with the information for the person. The screen 200 further includes an element, such as a button 254, which, when actuated, cancels any edits to the information about the person. The screen 200 further includes an element, such as a button 256, which, when actuated, deletes the person from the database 16.

In some embodiments, the text boxes correspond to fields in the database 16. More or fewer text boxes can be included in the screen 200.

FIGS. 4A, 4B, 4C, and 4D, when assembled, illustrate a screen 300 illustrating how only a portion of the data is stored in the database 16. More particularly, in the illustrated embodiments, the screen 300 includes an area 302 displaying the person's name, and an area 304 displaying only a portion of the person's sensitive personal number (e.g. social security number, social insurance number, passport number, credit card number, health insurance number, national identity number, state identity number, etc.). In the illustrated embodiments, only the last four digits of person's social security number are shown. Other portions of other types of sensitive numbers could be displayed.

In the illustrated embodiments, other information for the person is shown such as the person's date of birth 306, the person's AKA name 308, the person's age 310 at the date of an injury, the person's job title 312, the person's gender 314, the person's aliases 316, and the person's race 318. More or fewer other items about the person can be displayed.

In the illustrated embodiments, the screen 300 further includes an edit element 320 which, if actuated, allows the information about the person to be edited, such as by using screen 200 or a similar screen.

In embodiments where the system 10 is included in a law firm case management system of the type described in the above-incorporated patent application, the screen 300 may include additional information sections, in addition to the section 322. Section 322 includes a sub-section with the above-described information about the person. The additional sections can include, for example, a case summary section 324, a damages section 326, a litigation section 328, an incident information section 330, an insurance coverage section 332, and a related cases section 334. Other sections can be provided. In the illustrated embodiments, various of these additional sections include respective edit elements 336, 338, 340, etc. which, when actuated, allows the information in the section to be edited.

FIGS. 5A, 5B, 5C, and 5D, when assembled, illustrate a screen 400 showing how an image including complete data can be revealed, in accordance with various embodiments. More particularly, in various embodiments, when a user (e.g., a lawyer, paralegal, or data entry person) hovers over the portion of the person's sensitive personal number (e.g. social security number, social insurance number, passport number, credit card number, health insurance number, national identity number, state identity number, etc.), using a mouse, trackpad, touchpad, etc., an image 402 containing the full sensitive personal number in distorted format is revealed. The full number can be read by a human but cannot easily be read by a machine. In more particular embodiments, where the sensitive personal number is a social security number, the last four digits of the social security number are searchable and the full social security number is also available to a human but not to a machine. In some embodiments, only users with a certain clearance level (e.g. administrators or users granted high level access) can review or edit the full sensitive personal number.

While certain elements are shown, such as pull down menus, checkboxes, text boxes, buttons, hyperlinks, etc., other types of graphical user interface or HTML elements can be employed that perform the same functions or allow the same data to be entered.

While certain functions are illustrated as being performed in certain blocks, it should be understood that various functions may be performed in other blocks or in a combination of blocks. The blocks do not necessarily correspond to software functions or routines, to integrated circuits or to circuit blocks. Multiple blocks may be defined by a single function, routine or integrated circuit or a single block may be defined by multiple functions, routines or integrated circuits.

While some embodiments disclosed herein are implemented in software, alternative embodiments comprise hardware, such as hardware including digital logic circuitry. Still other embodiments are implemented in a combination of software and digital logic circuitry.

Various embodiments comprise a computer-usable or computer-readable medium, such as a hard drive, solid state memory, flash drive, floppy disk, CD (read-only or rewritable), DVD (read-only or rewritable), tape, optical disk, floptical disk, RAM, ROM (or any other medium capable of storing program code excluding a carrier wave or propagation signal) bearing computer program code which, when executed by a computer or processor, or distributed processing system, performs various of the functions described above.

Some embodiments provide a carrier wave or propagation signal embodying such computer program code for transfer of such code over a network or from one device to another. The term "non-transitory," if used in the claims, is meant to exclude only such a carrier wave or propagation signal.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

I claim:

1. A method comprising:
   receiving information about a person at a server, the information including a name and a personal number;
   storing the name and a portion of the personal number in a database in the server, such that the name and portion of the personal number are searchable;
   converting the personal number to an image that is designed to not be easily readable by optical character recognition, and storing the image;
   receiving, at the server, a request for a search of the database from a client device including a graphical user interface that has a movable pointer capable of hovering over a spot on the graphical user interface;
   displaying the name and the portion of the personal number, at a user client device in communication with the server, in response to results of the search matching information about the person; and
   displaying the image at the user client device in response to the pointer hovering over the portion of the personal number, wherein the image contains the full personal number in a non-linear arrangement of digits, and wherein the image is stored in the same database that contains the name and the portion of the personal number.

2. A method in accordance with claim 1 wherein the personal number is a government identity number.

3. A method in accordance with claim 2 wherein the identity number is a social security number.

4. A method in accordance with claim 1 wherein the personal number is a credit card number.

5. A method in accordance with claim 1 wherein the personal number is health information.

6. A method in accordance with claim 1 wherein the received information further includes a postal address, wherein the address is stored in the database, and wherein the address is searchable.

7. A system comprising:
   a server configured to receive information about a person, the information including a name and a personal number, the server including:
   a database having fields configured to store the name and a portion of the personal number, such that the name and the portion of the personal number are searchable;
   a formatter configured to convert the personal number to a non-linear format that is difficult for an automated system to recognize, and the server being configured to store the converted personal number in the database containing the name and portion of the personal number; and a graphical user interface generator configured to cause display of the name and the portion of the personal number at a user client device in communication with the server, in response to a search of the database requested from the client device resulting in information about the person matching the search, the graphical user interface generator including an display reveal detector which, if actuated by the user of the client device, causes the converted personal number to be displayed at the user client device.

8. A system in accordance with claim 7 wherein the database further stores medical records.

9. A system in accordance with claim 7 wherein the formatter generates an image.

10. A system in accordance with claim 7 wherein the formatter generates an image file including a distorted rendering of the personal number.

11. A system in accordance with claim 7 wherein the personal number is a government identity number.

12. A system in accordance with claim 7 wherein the identity number is a social security number.

13. A system comprising:
a server configured to receive information about a person, the information including a name and a social security number, the server including:
a database having fields configured to store the name and a portion of the personal number, such that the name and the portion of the social security number are searchable;
a formatter configured to convert the social security number to a distorted image containing all digits of the social security number such that the digits are not lined up, and that is difficult for an automated system to recognize, and the server being configured to store the distorted image in the database;
a graphical user interface generator configured to cause display of a graphical user interface showing the name and the portion of the personal number at a user client device in communication with the server; and
a user client device configured to receive the graphical user interface from the server and to display, in response to a successful search of the database, the name and the portion of the social security number, the graphical user interface generator including an display reveal detector which, if actuated by the user of the client device by the user hovering over the portion of the social security number, causes the distorted image to be displayed at the user client device.

14. A system in accordance with claim 13 wherein the portion of the social security number stored in the database of the server consists of the last four digits of the social security number.

15. A system in accordance with claim 13 wherein the client device communicates with the server over a virtual private network.

16. A system in accordance with claim 15 wherein the server supports a U2F protocol and wherein a U2F key is required at the user client device for the user client device to communicate with the server.

17. A system in accordance with claim 13 wherein the server supports a two factor security protocol and wherein a physical two factor security key is required at the user client device for the user client device to communicate with the server.

* * * * *